United States Patent
Shimizu et al.

[11] Patent Number: 6,069,863
[45] Date of Patent: May 30, 2000

[54] FOCUSING ADJUSTMENT OF AN OPTICAL PICKUP

[75] Inventors: Manabu Shimizu; Yuhdzi Ishida; Kenzo Shodo, all of Kyoto, Japan

[73] Assignee: Rohm Co., Ltd., Kyoto, Japan

[21] Appl. No.: 09/235,854

[22] Filed: Jan. 22, 1999

[30] Foreign Application Priority Data

Jan. 23, 1998 [JP] Japan ................................. 10-011356

[51] Int. Cl.[7] ....................................................... G11B 7/13
[52] U.S. Cl. ................... 369/112; 369/44.14; 369/44.32; 369/44.41; 369/103
[58] Field of Search ................................. 369/112, 44.12, 369/44.14, 116, 109, 122, 103, 44.41, 44.42, 44.32, 44.28, 44.26

[56] References Cited

U.S. PATENT DOCUMENTS

| | | | |
|---|---|---|---|
| 5,048,000 | 9/1991 | Tsuji et al. | 369/44.12 |
| 5,062,098 | 10/1991 | Hori et al. | 369/112 |
| 5,130,963 | 7/1992 | Kusano et al. | 369/44.28 |
| 5,272,329 | 12/1993 | Nagahama et al. | 250/216 |
| 5,283,772 | 2/1994 | Miyake et al. | 369/44.41 |
| 5,410,529 | 4/1995 | Kurata et al. | 369/109 |
| 5,798,989 | 8/1998 | Shodo | 369/44.41 |
| 5,815,473 | 9/1998 | Takahashi et al. | 369/44.26 |

FOREIGN PATENT DOCUMENTS

| | | | |
|---|---|---|---|
| 0 556 062 A1 | 8/1993 | European Pat. Off. | |
| 5-9851 | 6/1989 | Japan | G11B 7/09 |

OTHER PUBLICATIONS

Patent Abstracts of Japan, 62121933, Jun. 3, 1987.
Patent Abstracts of Japan, 09288249, Nov. 4, 1997.
Patent Abstracts of Japan, 09035291, Feb. 7, 1997.
Patent Abstracts of Japan, 08111026, Apr. 30, 1996.
European Search Report, EP 99 10 1265, Jun. 9, 1999.

*Primary Examiner*—Tan Dinh
*Assistant Examiner*—Kim-Kwok Chu
*Attorney, Agent, or Firm*—Hoffmann & Baron, LLP

[57] ABSTRACT

An optical pickup includes a diffraction element for causing diffraction in a reflection beam from a disc. This diffraction element is divided into two of first and second regions. On four light receiving elements are converged respectively a first reflection beam from a first region and a second reflection light from a second region. A switch performs switching-over between four output signals individually taken from four light receiving elements and three output signals in total taken out by adding together two output signals of four output signals.

13 Claims, 9 Drawing Sheets

F I G. 9
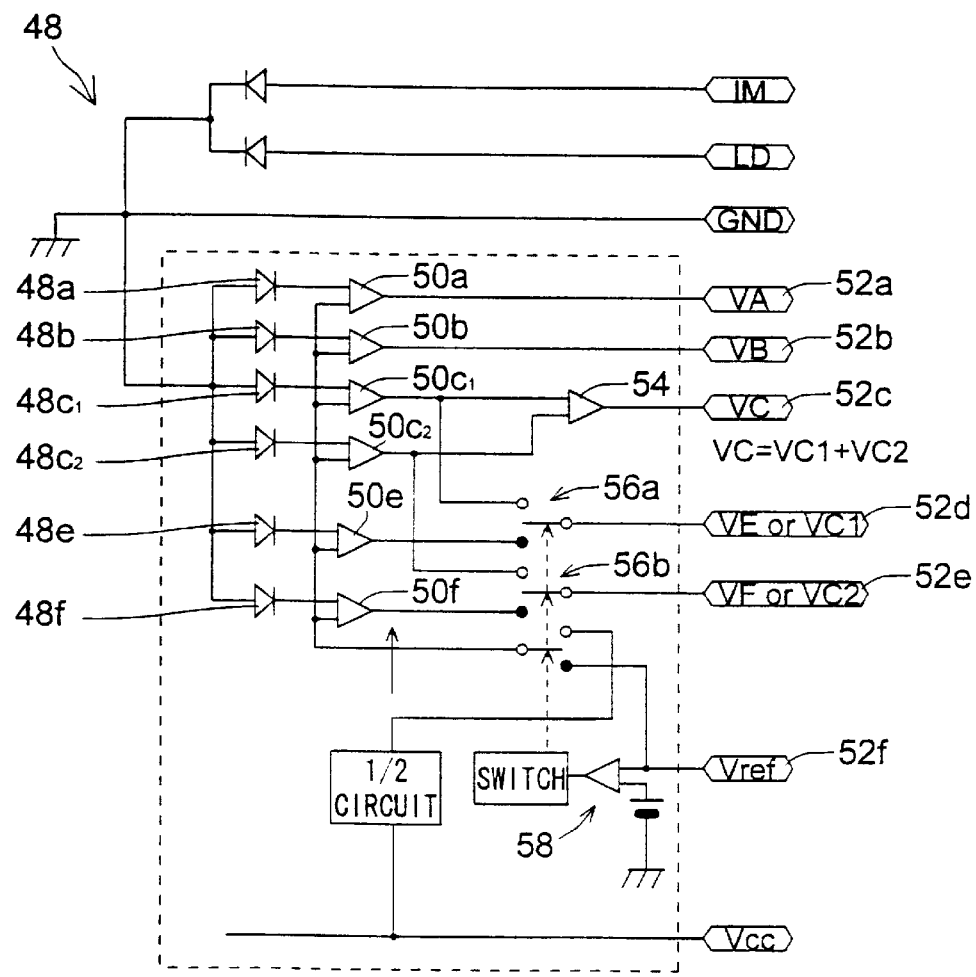

FOCUSING ADJUSTMENT OF AN OPTICAL PICKUP

BACKGROUND OF THE INVENTION

1. Field of the Invention

The present invention relates to optical pickups, and more particularly to an optical pickup and method of adjusting same used to read information from an optical disc (hereinafter merely referred to as "disc"), such as CD and DVD.

2. Description of the Prior Art

There is disclosed one example of a conventional optical pickup of this kind in Japanese Patent Publication No. H5-9851. This conventional art has a diffraction element 3 to cause diffraction in a main beam reflected from a disc 6 and split it into two. These diffracted beams are converged onto regions 7a, 7b and 7c of a light receiving element 7 so that the difference (Sa−Sb) in output signal of between the regions 7a and 7b provides a focusing error signal while the sum (Sa+Sb+Sc) of the output signals from the areas 7a, 7b and 7c gives a pit signal.

In such an optical pickup, the adjustment in positional relationship between the diffraction element 3 and the light receiving element 7 requires actual rotation of the disc 6 to perform focusing servo using a servo circuit. The diffraction element 3 is displaced such that the jitter value observed by a jitter meter is brought to a best.

In the conventional optical pickup, however, there has been a problem that the adjustment is troublesome and consumes a long time, because it requires actual rotation of a disc 6 in order to implement focussing servo. Also, there has been another problem that the provision of the servo circuit results in mounting-up of cost. Moreover, there has been still another problem that the optical pickup is difficult to stabilize its characteristics, because the displacement of the diffraction element is based on a jitter value as a reference that is susceptible to noises.

SUMMARY OF THE INVENTION

Therefore, it is a primary object of the present invention to provide a novel optical pickup and method of adjusting same.

It is another object of the present invention to provide an optical pickup which is low in cost, easy to adjust and can stabilize a defocusing characteristic thereof.

This invention is characterized by a method of adjusting an optical pickup having a laser device for emitting laser light, a lens for converging the laser light on a disc, a diffraction element divided into two of a first region and a second region to respectively cause diffraction in reflected light from the disc, and a photo-detector separated by a divisional line extending almost in a same direction as a direction of diffraction by the first region and including a first portion and a second portion onto which the reflected light diffracted by the first region converges and a third portion onto which the reflection light diffracted by the second region converges, the adjusting method comprising the steps of: placing a mirror in a position of the disc; grasping as a waveform a relationship between a position of the lens and respective output values of the first portion and the second portion; and displacing the diffraction element such that the waveform becomes a predetermined state.

In the present invention, observation is made on a relationship between the lens position in a direction perpendicular to a disc surface and respective output values of the first and second portions. If the diffraction element is displaced such that an intersection of a first waveform and a second waveform, i.e., the point to which focus servo is effected, is brought into overlap with a center point of a maximum value range of a third waveform representative of the lens position and an output value of a third portion, i.e., the point at which the spot size assumes a minimum, then it is possible to prevent against focusing offset and bring best the jitter value.

Also, the third portion may be divided, for example, as a portion 3a and a portion 3b, in order to grasp as waveforms 3a and 3b a relationship between the change in lens position and respective outputs of the portions 3a and 3b. The diffraction element may be displaced such that the intersection of the first and second waveforms is brought into overlap with the intersection of the waveform 3a and the waveform 3b, i.e., such that the spot size assumes a minimum. Due to this, the focusing offset can be prevented with the jitter value taken best. In also this case, the number of output signals increases due to the division of the third portion into the portions 3a and 3b. However, if an optical pickup of the invention to be referred later is utilized, two signals can be selectively taken out through one terminal by a switch means. This can prevent the number of terminals from increasing.

An optical pickup to be favorably utilized in the adjusting method of the present invention, comprises: a lens for converging a laser beam from a laser device on a disc; a diffraction element divided into two of first and second regions for diffracting a reflection beam from the disc; four light receiving elements on which first and second reflection light respectively diffracted by the first and second regions converge; and a switch means for switching over between four output signals individually taken from the for light receiving elements and three output signals taken out by adding together two of four output signals.

Another optical pickup comprises: a first diffraction element for causing a laser beam from a laser device to be split into one main beam and two sub-beams; a lens for converging the main beam and the sub-beams on a disc; a second diffraction element divided into two of first and second regions to respectively cause diffraction in the reflection beams from the disc; a photo-detector having four light emitting elements to converge thereon reflection beams of the main beam respectively diffracted by the first region and the second region, and two light receiving elements for converging thereon reflection beams of the sub-beams; and a switching means for switching over between taking out an output signal associated with any of the four light receiving elements and taking out a tracking error signal by subtracting between output signals of the two light receiving elements.

According to the present invention, the positional relationship between the diffraction element and the photo-detector is easy to adjust. Also, there is no neccesity of separately providing a servo circuit or the like, thus reducing cost. Meanwhile, because the jitter value can be determined best as a result of the spot size being brought to a minimum at a point where focusing servo is effected, the optical pickup is stabilized in its characteristics. Moreover, the number of terminals is prevented from increasing, thereby preventing against increase in package size.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a circuit diagram showing the photo-detector of FIG. 8; and

DETAILED DESCRIPTION OF THE PREFERRED EMBODIMENTS

Figure 1:
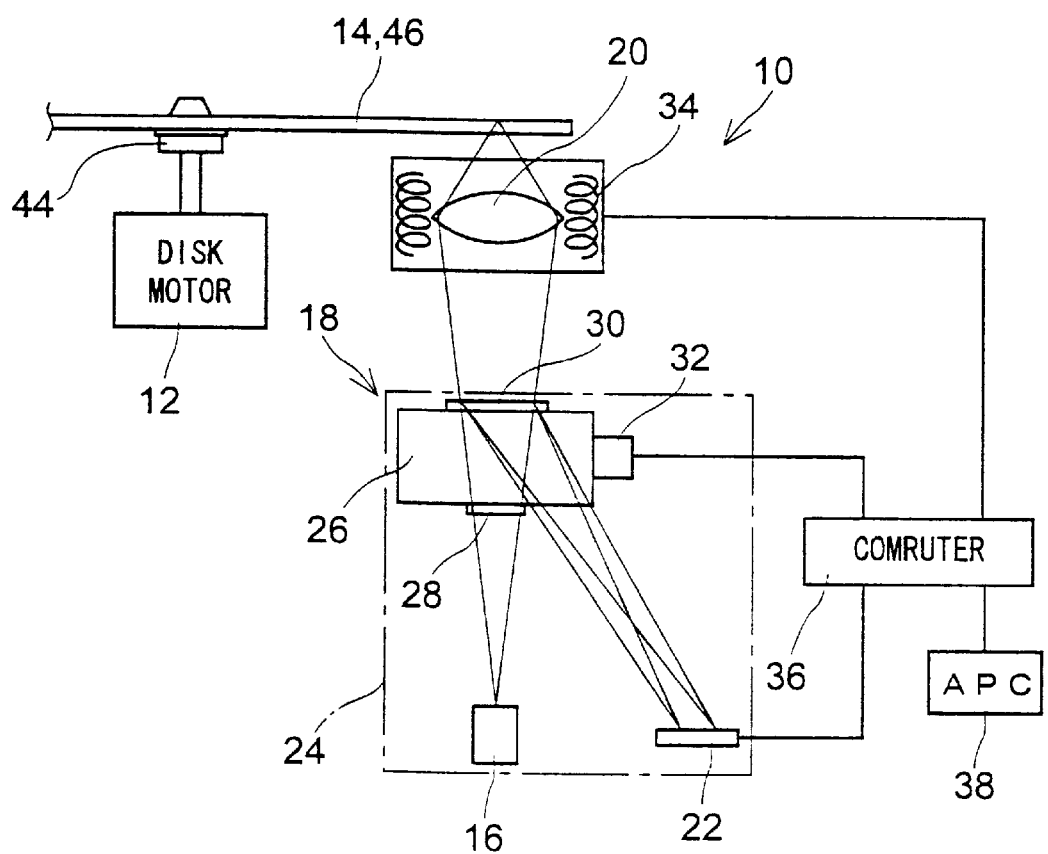
FIG. 1 is an illustrative view showing one embodiment of the present invention.
Figure 4:
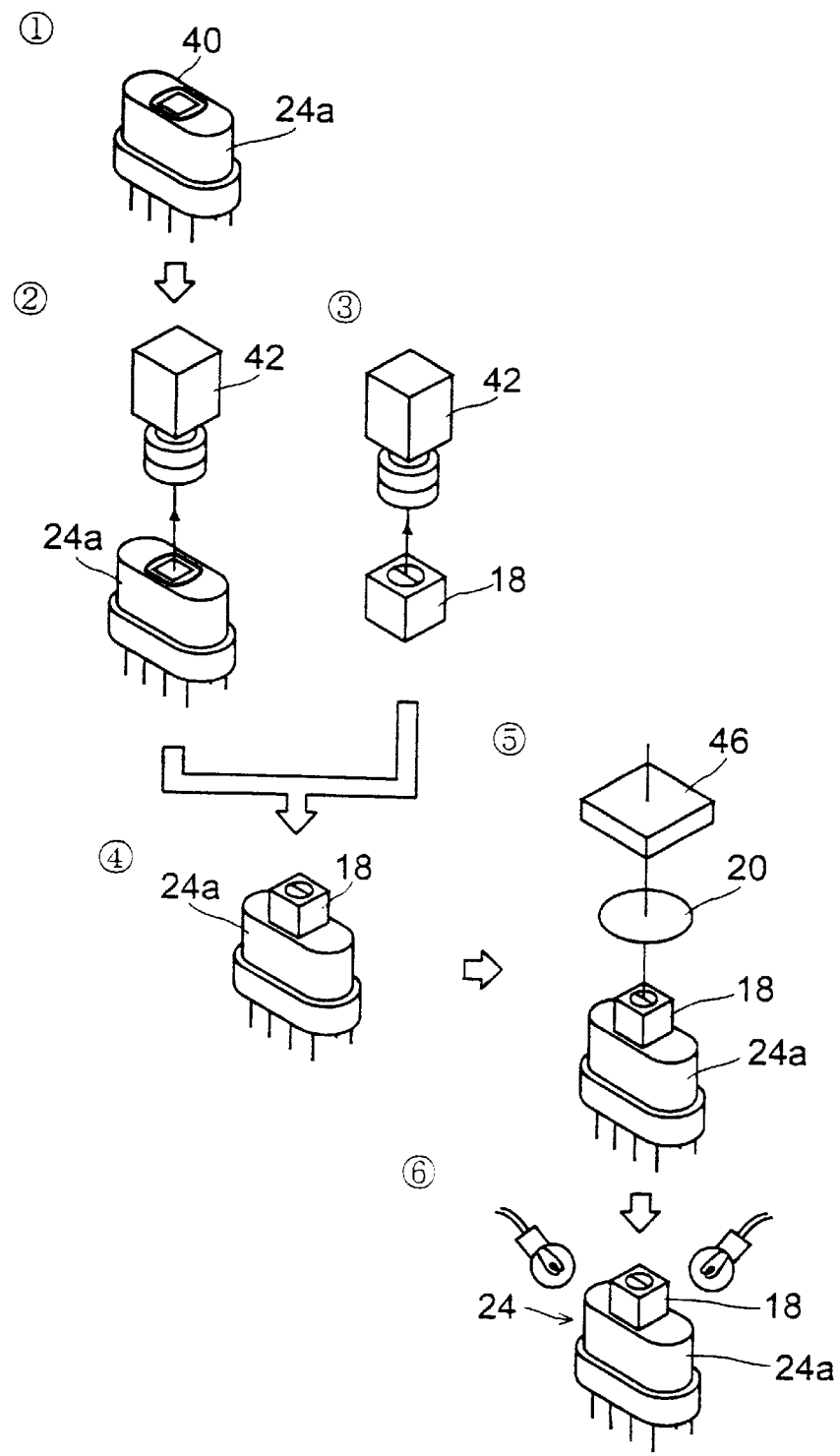
FIG. 4 is an illustrative view showing how to assemble the optical pickup.

An optical pickup 10 of the present embodiment, as shown in FIG. 1, is to read information out of an optical disc (hereinafter merely "disc") 14, such as CD and DVD, being rotated by a disc motor 12, and includes a semiconductor laser device 16 as a light source to emit a predetermined wavelength of laser light. A hologram unit 18 as a diffraction element and an objective lens 20 are arranged between the semiconductor laser device 16 and the disc 14. A photo-detector 22 is provided obliquely below the hologram unit 18. Note that these semiconductor laser device 16, hologram unit 18 and photo-detector 22 are formed in one body as a unit 24 as shown in FIG. 4.

Figure 3:
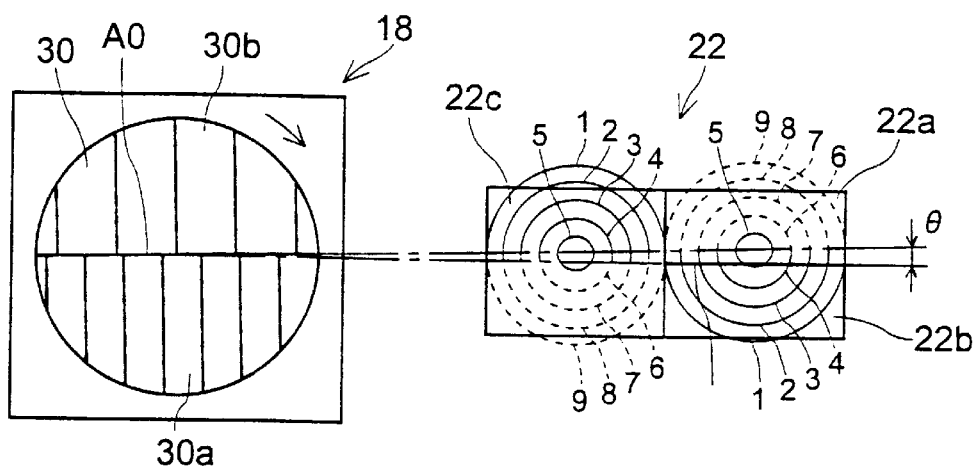
FIG. 3 is an illustrative view showing a manner to adjust a positional relationship between the photo-detector and the hologram unit.

The hologram unit 18 includes a substrate 26 made of a quartz glass or the like. The substrate 26 has a grating pattern 28 formed at an underside surface in order to create three beams, and a hologram pattern 30 on a top surface to cause polarization of light. The hologram pattern 30 is divided with a first region 30a and a second region 30b by a divisional line A0 extending in a diametrical direction of the disc 14, as shown in FIG. 3. The regions 30a and 30b are provided with respective gratings different in period. The hologram unit 18 is held by a support member 32 (FIG. 1) which is to be displaced in directions X, Y and θ by a servo motor.

The objective lens 20 is fixed to an actuator coil 34 constituting a focusing actuator so that it is vertically displaced by energizing the actuator coil 34.

The photo-detector 22 is divided into five portions, i.e., light receiving elements 22a, 22b, 22c, 22e and 24f. The light receiving element 22a and the light receiving element 22b are separated by a divisional line B0 is given almost in a same direction as but slightly deviated from a direction of diffraction by the hologram pattern 30 in order to prevent against focusing offset.

Meanwhile, a computer 36 is connected to the support member 32, the actuator coil 34 and the light receiving elements 22a–22f of the photo-detector 22. The computer 36 is connected with an APC (Automatic Power Control) 38 to control the output of the semiconductor laser device 16.

During assembly of the assembling such an optical pickup 10, an adjusting method is employed to conduct adjustment on the positional relationship between the hologram unit 18 and the photo-detector 22 as shown in FIG. 4, in order to prevent against focusing offset and optimize the jitter value.

In step ①, a stem 24a is first prepared having a semiconductor laser device 16 and a photo-detector 22 incorporated therein in one body. A UV resin 40 is applied to a top surface of the stem 24a. In step ②, the semiconductor laser device 16 is caused to emit light, to thereby determine its light emission center with using a CCD camera 42. Alternatively, in step ③ a hologram unit 18 is recognized by the CCD camera 42 to determine its device center. In succeeding step ④, the hologram unit 18 is mounted on the top surface of the stem 24a. In step ⑤, this hologram unit 18 is fixed at a predetermined position as shown in FIG. 1.

Then, a half mirror (or total reflection mirror) 46, to be used instead of and in place of the disc 14, is placed on the turntable 44 to be rotated by the disc motor 12, and the semiconductor laser device 16 is caused to emit light. Thereupon the laser beam from the semiconductor laser device 16 is diffracted by the grating pattern 28, and split into 0-order diffraction light (main beam) and two of 1-order diffraction light (sub-beams). The three beams thus split by the grating pattern 28 travels through the hologram pattern 30, and converge on the half mirror 46 through the objective lens 20. The reflection light of the main beam from the half mirror 46 travels through the objective lens 20, being diffracted by the hologram pattern 30. Thereupon the light diffracted by the region 30a shown in FIG. 3 is converged onto the light receiving elements 22a and 22b of the photo-detector 22, while the light diffracted by the region 30b is converged onto the light receiving element 22c.

Figure 5:
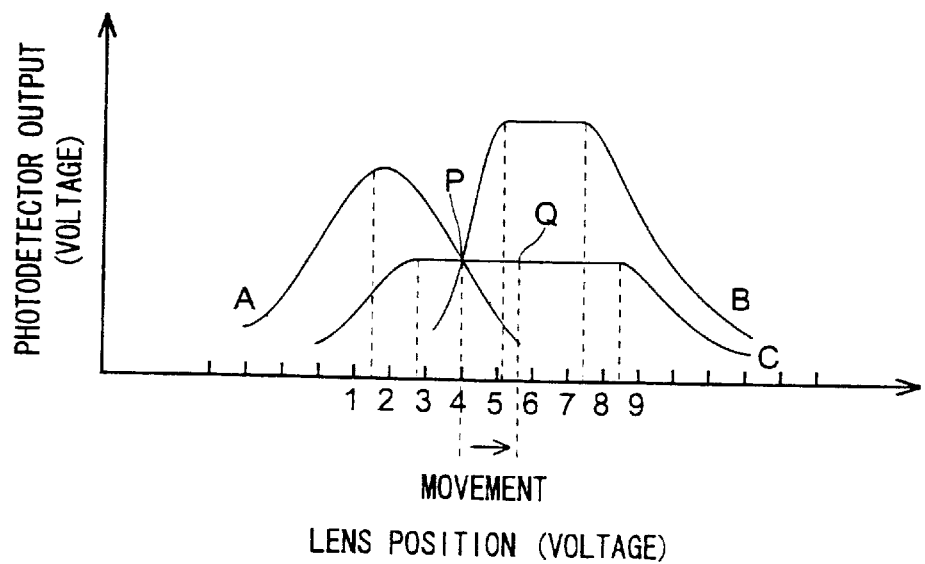
FIG. 5 is a graph showing how to adjust a position of the hologram unit.

Then the actuator coil 34 is energized to move the objective lens 20 in vertical directions. Such a graph as shown in FIG. 5 is grasped by the computer 36 as to a relationship between a vertical position of the objective lens 20, i.e., a position perpendicular to the record surface of the disc 14 (voltage on the actuator coil 34) and output values from the light receiving elements 22a, 22b and 22c of the photo-detector 22. Note that spots 1–9 are shown in FIG. 3 corresponding to lens positions 1–9 in FIG. 5.

Figure 6:
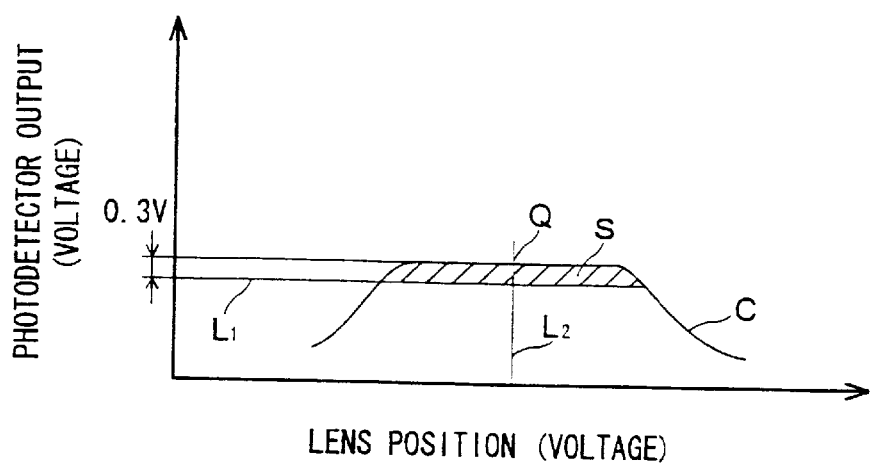
FIG. 6 is a graph showing how to determine a point Q.

In the graph of FIG. 5, a point P represents an intersection between an output waveform A given from the light receiving element 22a and an output waveform B from the light receiving element 22b, i.e., the point toward which focusing servo is effected. On the other hand, a point Q represents a center point in a maximum value range (the range in which the output assumes its maximum) of an output waveform C given from the light receiving element 22c. For example, the point Q can be determined as an intersection of the output waveform C with a vertical line L2 as shown in FIG. 6, wherein a horizontal line L1 is drawn through a point lower by 0.3 V than a peak value of the output waveform C and a horizontal line L2 is then drawn to equally divide into two an area S (the area hatched in FIG. 6) above the horizontal line L1. This point Q represents a point at which the size of a laser spot assumes its minimum. Accordingly, if the intersection P and the point Q overlap each other, the focus servo is effected at that point with a minimum spot size. As a result, the jitter value becomes best. In order to achieve this, a not-shown servo motor is controlled by the computer 36 to move the support member 32 so that the hologram unit 18 is aligned in position to overlap the intersection P overlap with the point Q. Note that FIG. 3 shows a state wherein there exists a deviation in angle θ between the hologram unit 18 and the photo-detector 22. When the hologram unit 18 is rotated by an angle θ in an arrow direction from the state of FIG. 3, the point P and the point Q become overlapping with each other. The position of the hologram unit 18 is optimally determined by repeating several times such positional adjustment of the hologram unit 18 as described above.

In step ⑥, light radiation is made to a contact area between the stem 24a and the hologram unit 18, thus fixing the hologram unit 18.

It is possible to obtain a tracking error signal by subtracting between output signals respectively given from the light receiving element 22e and the light receiving element 22f during actual rotation of the disc 14.

This embodiment can lower cost because of no necessity of separately providing a servo circuit and the like to enable positional adjustment. Furthermore, the jitter value can best be obtained as a result of minimizing the spot size at a point to which focus servo is effected. It is therefore possible for the optical pickup 10 to stabilize the characteristic.

Figure 7:
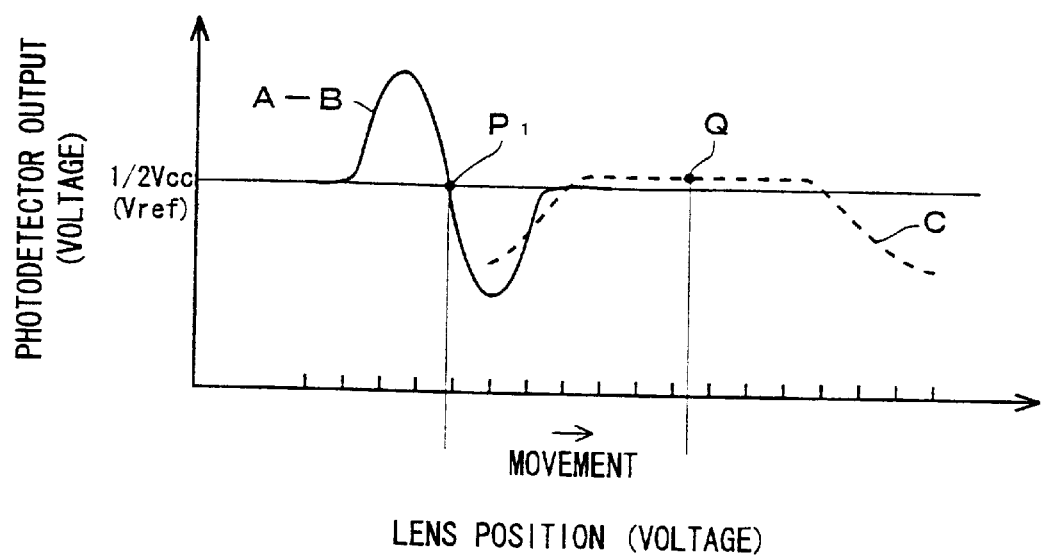
FIG. 7 is a graph showing another method to adjust a position of the hologram unit.

Incidentally, in the above embodiment the hologram unit 18 was aligned in position so as to make the intersection P of the output waveforms A and B overlap with the point Q. Alternatively, the hologram unit 18 may be aligned in position in a manner overlapping a zero cross point (the point to which focus servo is effected) P1 of an S waveform (A–B) with a point Q as shown in FIG. 7, so that the difference in output value between the light receiving elements 22a and 22b can be expressed as an S waveform (A–B) by the computer 36.

Figure 8:
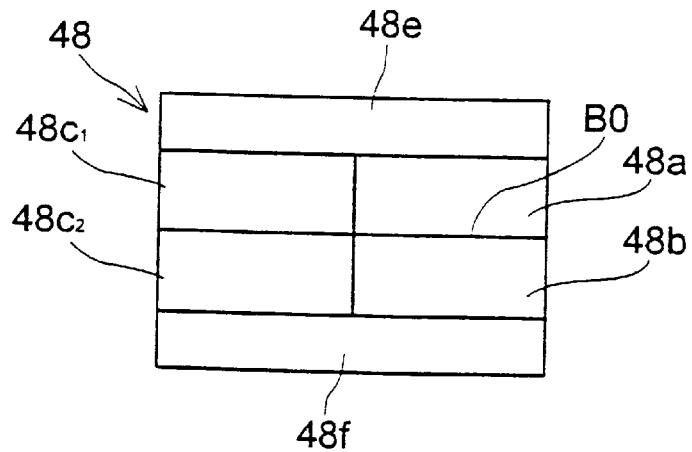
FIG. 8 is an illustrative view showing another photo-detector.

Also, the above-described embodiment employed the photo-detector 22 having five divided portions (light receiving elements). In place of the photo-detector 22, a photo-detector 48 as shown in FIGS. 8 and 9 may be used which is divided into six portions (light receiving elements). As will be well understood from FIG. 9, the photo-detector 48 includes six light receiving elements 48a, 48b, 48c1, 48c2, 48e, 48f. The light receiving elements 48a–48f are connected with corresponding amplifiers 50a–50f. The amplifiers 50a and 50b have output signals respectively given onto terminals 52a and 52b. The amplifiers 50c1 and 50c2 have output signals which are added together by an adder 54 and then given onto a terminal 52c. The output signals of the amplifiers 50c1 and 50c2 are respectively given onto terminals 52d and 52e, when the switches 56a and 56b are in a first state. The amplifiers 50e and 50f have output signals which are respectively given onto terminals 52d and 52e, when switches 56a and 56b are in a second state. The switches 56a and 56b are operated based on an output signal of a voltage comparator circuit 58 that is dependent upon a reference voltage applied to a terminal 52f.

Figure 10:
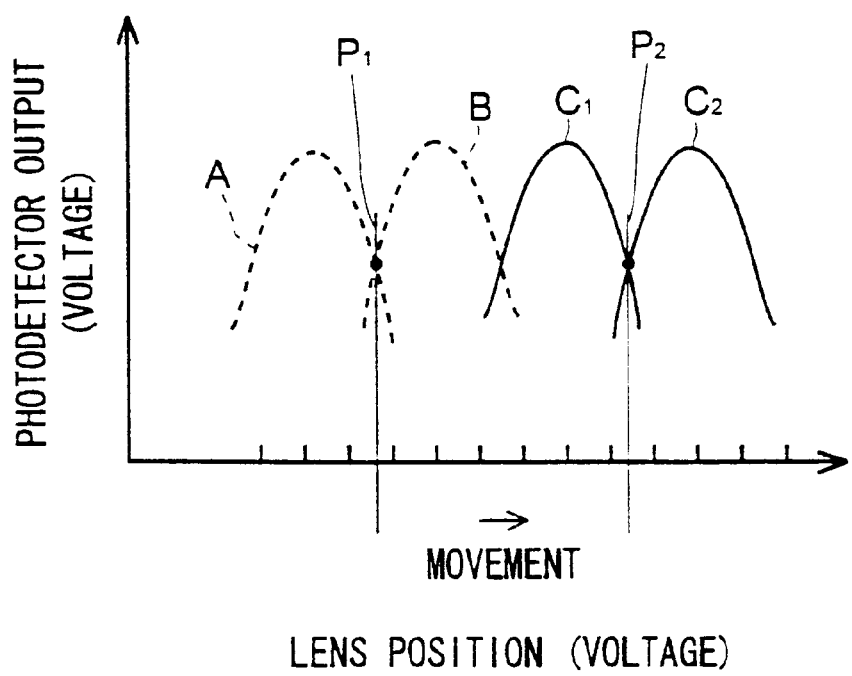
FIG. 10 is a graph showing how to adjust a position of a hologram unit when using the photo-detector of FIG. 9.

In an optical pickup 10 using the photo-detector 48, when the hologram unit 18 is aligned in position, the objective lens is vertically displaced with the switches 56a and 56b rendered in the first state. As shown in FIG. 10, the hologram unit 18 is adjusted in position such that an intersection P1 (the point to which focus servo is effected) between an output wave A of the light receiving element 48a taken out through the terminal 52a and an output waveform B of the light receiving element 48b taken through the terminal 52b is brought into overlap with an intersection P2 (the point at which the laser spot size assumes a minimum) between an output waveform C1 of the light receiving element 48c1— through the terminal 52d and an output waveform c2 of the light receiving element 48c2—through the terminal 52e. On the other hand, when the disc 14 is being rotated, the switches 56a and 56b are put in the second state. Subtraction is made between output signals of the light receiving element 50e taken through the terminal 52d and an output signal of the light receiving element 50f taken through the terminal 52e to thereby obtain a tracking error signal. The output signals through the terminals 52a, 52b and 52c are added together to thereby obtain a pit signal.

By employing such a photo-detector 48, the position of the hologram unit 18 becomes easy to adjust depending on increased number of signals. Furthermore, because two or more signals can be selectively obtained by switching the switches 56a and 56b, it is possible to prevent against an increase in the number of terminals and in package size.

Figure 2:
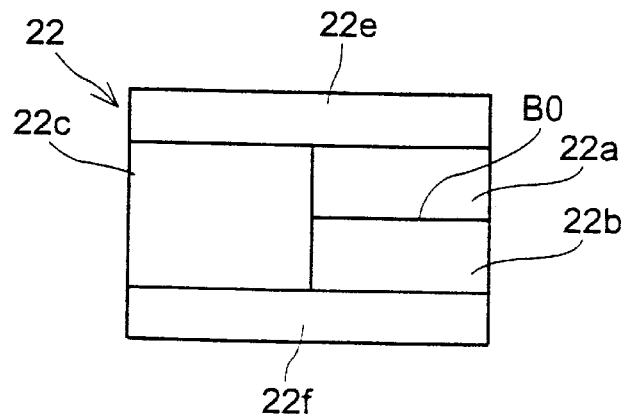
FIG. 2 is an illustrative view showing a photo-detector used in the FIG. 1 embodiment.
Figure 11:
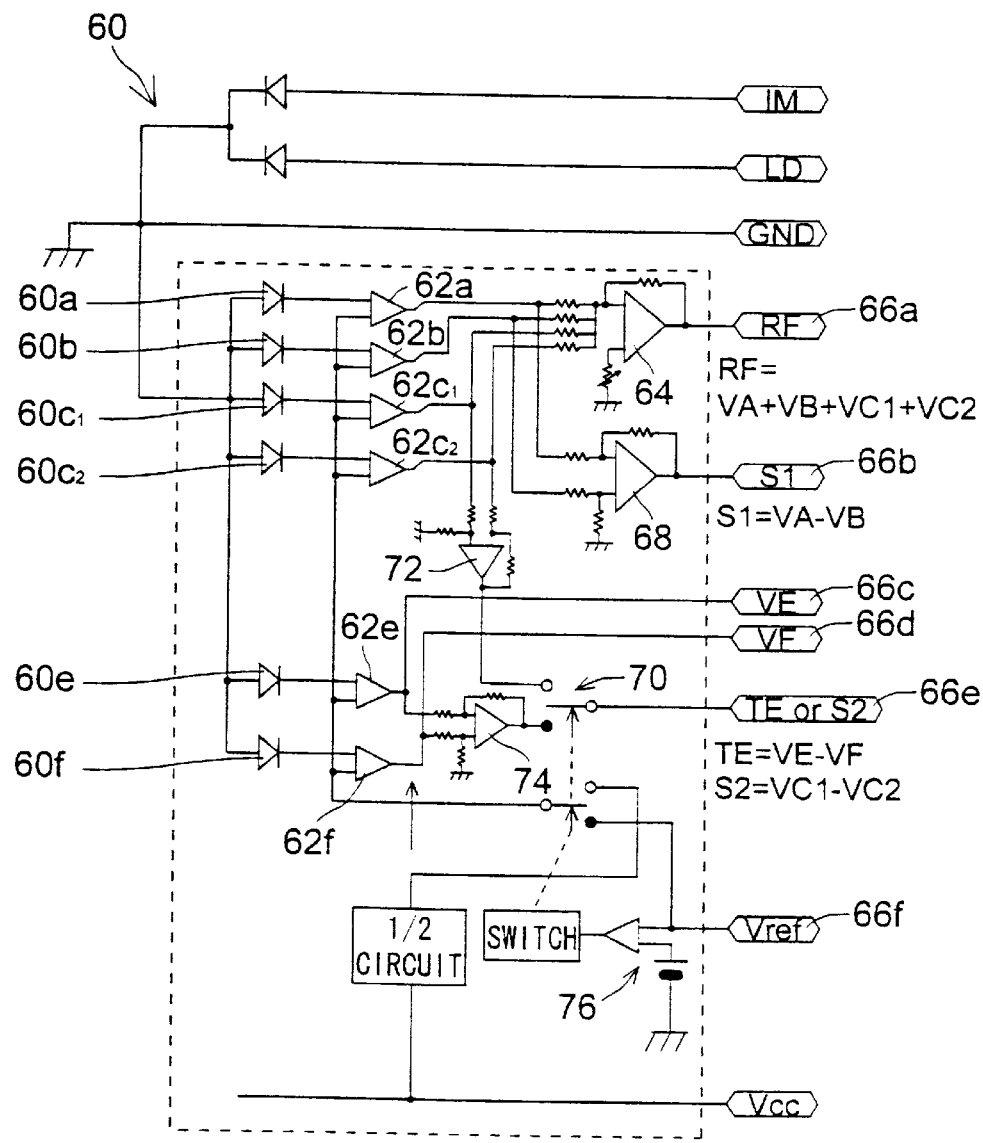
FIG. 11 is a circuit diagram of an alternative embodiment of the photo-detector.

Also, a photo-detector 60 as shown in FIG. 11 may be used in place of the above-described photo-detector 22 (FIG. 2) or photo-detector 48 (FIG. 8, FIG. 9). This photo-detector 60 includes six light receiving elements 60a, 60b, 60c1, 60c2, 60e, 60f. The light receiving elements 60a–60f are connected with corresponding amplifiers 62a–62f. The amplifiers 62a, 62b, 62c1 and 62c2 have output signals which are added together by an adder 64 and then taken as a pit signal Rf through a terminal 66a. The amplifiers 62a and 62b have output signals which are subjected to subtraction by a subtracter 68 and then taken through a terminal 66b. Also, the amplifiers 60e and 60f have output signals which are respectively taken through terminals 66c and 66d. The amplifiers 62c1 and 62c2 have output signals which are subjected to subtraction by a subtracter 72 when the switch 70e in the first state, while the amplifiers 62e and 62f have output signals which are subjected to subtraction by a subtracter 74 and taken through a terminal 66e when the switch 70 is in the second state. The switch 70 is operated based on an output signal of a voltage comparator circuit 76 that is dependent upon a reference voltage applied to a terminal 66f.

Figure 12:
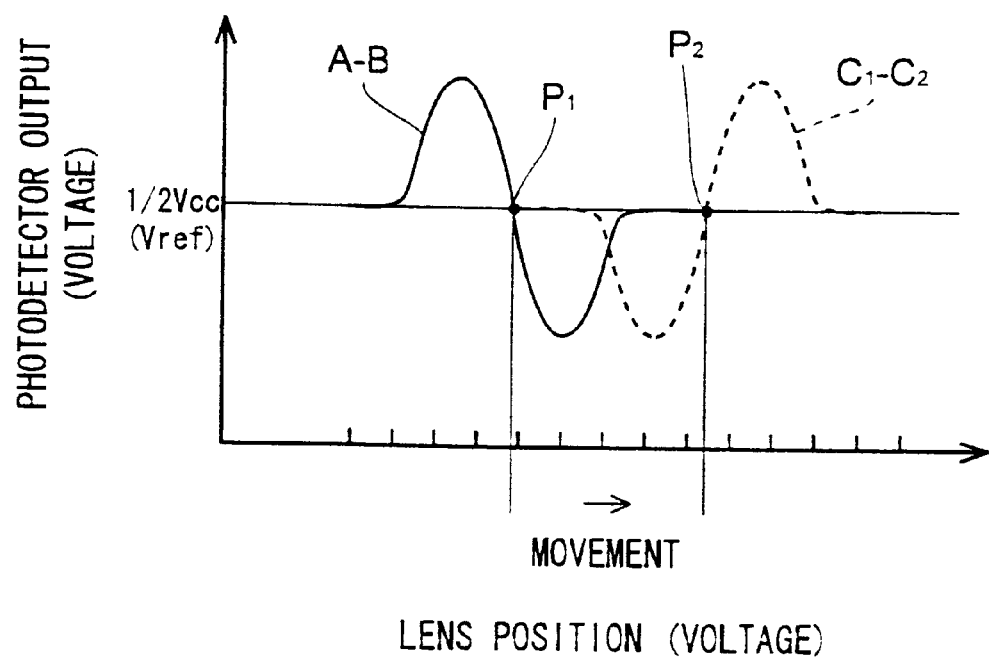
FIG. 12 is a graph showing how to adjust a position of the hologram unit when using the photo-detector of FIG. 11.

In an optical pickup 10 using the photo-detector 60, when the hologram unit 18 is aligned in position, the objective lens 20 may be vertically moved with the switch 70 placed in the first state. As shown in FIG. 12, the hologram unit 18 may be adjusted in position such that a zero cross point (the point to which focussing servo is effected) P1 in an S waveform (A–B) taken through the terminal 66b is overlapped with zero cross point (the point at which the laser spot size assumes a minimum) P2 in an S waveform (C1–C2) taken through the terminal 66e. On the other hand, when the disc 46 is being rotated, the switch 70 is put in the second state to obtain a tracking error signal TE through the terminal 66e and a pit signal RF through the terminal 66a.

In the case where the photo-detector 60 is used, the hologram unit 18 can be easily adjusted in position without increasing the number of terminals in a manner similar to the case using the photo-detector 48.

Incidentally, the above-described photo-detectors 48 (FIG. 8 and FIG. 9) and 60 (FIG. 11) are one examples of a photo-detector having six light receiving element. The adders 54 and 64 and the subtracters 68, 72 and 74 may be arbitrarily combined to take other signals from the terminals.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of adjusting the positional relationship between a hologram unit and a photo-detector of an optical pickup having a laser device for emitting laser light, a lens for converging the laser light on a disc, a diffraction element divided into two of a first region and a second region to respectively cause diffraction in reflected light from said disc, the photo-detector being separated by a divisional line extending almost in a same direction as a direction of diffraction by said first region and including a first portion and a second portion onto which the reflected light diffracted by said first region converges and a third portion onto which the reflection light diffracted by said second region converges, said adjusting method comprising the steps of:

substituting a mirror in a position of said disc;

expressing a relationship between a position of said lens and respective output values of said first portion and said second portion as a waveform; and displacing said diffraction element to achieve desired characteristics of said waveform.

2. An adjusting method according to claim 1, wherein the relationship between the position of said lens and the respective output values of said first portion and said second portion is expressed as first and second waveforms, a relationship between the position of said lens and an output value of said third portion being expressed as a third waveform, and said diffraction element being displaced such that an intersection of the first waveform and the second waveform overlaps a center point of a maximum value range of the third waveform.

3. An adjusting method according to claim 1, wherein a relationship between the position of said lens and a difference in output value between said first portion and said second portion is expressed as an S waveform, a relationship between the position of said lens and an output value of said third portion being expressed as a third waveform, and said diffraction element being displaced such that a zero cross point of the S waveform is overlaps a center point of maximum value range of the third waveform.

4. An adjusting method according to claim 1, wherein said third portion includes portions 3a and 3b separated by a divisional line extending almost in a same direction as a direction of diffraction by said second region to respectively converge the reflection light diffracted by said second region thereon, a relationship between the position of said lens and respective output values of said portions 3a and 3b being expressed as waveforms 3a and 3b, and said diffraction element being displaced such that an intersection of the first waveform and the second waveform overlaps with an intersection of the waveform 3a and the waveform 3b.

5. An adjusting method according to claim 1, wherein said third portion includes portions 3a and 3b separated by a divisional line extending almost in a same direction as a direction of diffraction by said second region to converge the reflection beam diffracted by said second region thereon, a relationship between the position of said lens and a difference in output value between a said first portion and said second portion being expressed as a 1S waveform, a relationship between a positional change of said lens and a difference in output value between said portions 3a and 3b being expressed as a 2S waveform, and said diffraction element being displaced such that a zero cross point of the 1S waveform overlaps a zero cross point of the said 2S waveform.

6. An optical pickup comprising:

a lens for converging a laser beam from a laser device on a disc;

a diffraction element divided into two of first and second regions for diffracting a reflection beam from said disc;

four light receiving elements to converge thereon first and second reflection light of the laser beam respectively diffracted by said first and second regions; and a switch means for switching between four output signals taken individually from said four light receiving elements and three output signals, two of said three output signals being taken individually from any two of said four light receiving elements and a third of said three output signals being a sum of those of the four light receiving elements not used in said two of said three output signals.

7. An optical pickup according to claim 6, further comprising an adder to output a pit signal by totaling the four output signals from said four light receiving elements.

8. An optical pickup according to claim 7, further comprising a subtracter to determine a difference in output signal from two light receiving elements of said four light receiving elements.

9. An optical pickup according to claim 6, further comprising a subtracter to determine a difference in output signal from two light receiving elements of said four light receiving elements.

10. An optical pickup comprising:

a first diffraction element for causing a laser beam from a laser device to be split into on main beam and two sub-beams;

a lens for converging the main beam and the sub-beams onto a disc;

a second diffraction element divided into two of first and second regions to respectively cause diffraction in the reflection beams from said disc;

a photo-detector having four light receiving elements to converge thereon reflection beams of the main beam respectively diffracted by said first region and said second region, and two light receiving elements for converging thereon reflection beams of the sub-beams; and a switching means for switching between an output signal associated with any of said four light receiving elements and a tracking error signal obtained by subtracting output signals of said two light receiving elements.

11. An optical pickup according to claim 9, further comprising a subtracter to determine a difference in output signal from two light receiving elements of said four light receiving elements.

12. An optical pickup according to claim 10, further comprising an adder to output a pit signal by totaling four output signals from said four light receiving elements.

13. An optical pickup according to claim 12, further comprising a subtracter to determine a difference in output signal from two light receiving elements of said four light receiving elements.

* * * * *